(12) United States Patent
Pasqualini

(10) Patent No.: US 7,042,267 B1
(45) Date of Patent: May 9, 2006

(54) GATED CLOCK CIRCUIT WITH A SUBSTANTIALLY INCREASED CONTROL SIGNAL DELAY

(75) Inventor: Ronald Pasqualini, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 24 days.

(21) Appl. No.: 10/848,673

(22) Filed: May 19, 2004

(51) Int. Cl.
*G06F 1/04* (2006.01)
(52) U.S. Cl. .................. 327/291; 327/294; 327/299
(58) Field of Classification Search ................ 327/291, 327/293, 294, 298, 299, 164–166, 172–176, 327/261, 262, 284, 285
See application file for complete search history.

(56) References Cited

U.S. PATENT DOCUMENTS

| | | | | |
|---|---|---|---|---|
| 5,475,322 A | * | 12/1995 | MacDonald | 326/93 |
| 5,886,582 A | * | 3/1999 | Stansell | 331/1 A |
| 5,892,373 A | * | 4/1999 | Tupuri et al. | 326/97 |
| 6,242,960 B1 | * | 6/2001 | Bae | 327/299 |
| 6,320,437 B1 | * | 11/2001 | Ma | 327/175 |
| 6,496,554 B1 | * | 12/2002 | Ahn | 375/376 |
| 6,552,572 B1 | * | 4/2003 | Cheung et al. | 326/93 |
| 6,566,924 B1 | * | 5/2003 | Lin et al. | 327/160 |

* cited by examiner

*Primary Examiner*—Timothy P. Callahan
*Assistant Examiner*—Hai L. Nguyen
(74) *Attorney, Agent, or Firm*—Mark C. Pickering

(57) ABSTRACT

A gated clock circuit outputs a gated clock signal in response to a master clock signal and a control signal that has a rising or falling edge that follows a rising edge of the master clock signal by a delay. The gated clock signal has a pulse width that is equal to, and in phase with, the pulse width of a master clock signal, while at the same time substantially increasing the maximum value of the delay.

20 Claims, 3 Drawing Sheets

(PRIOR ART) MCLK (PRIOR ART) CG (PRIOR ART) GCLK (PRIOR ART) MCLK (PRIOR ART) CG (PRIOR ART) QOUT (PRIOR ART) GCLK

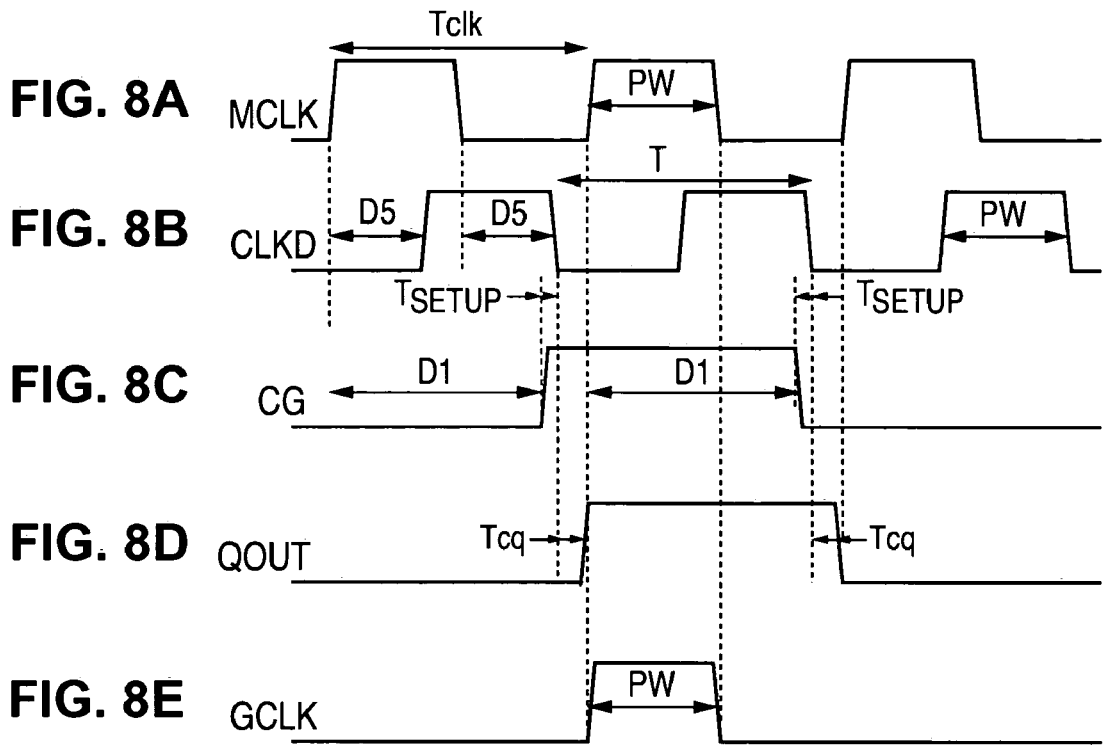
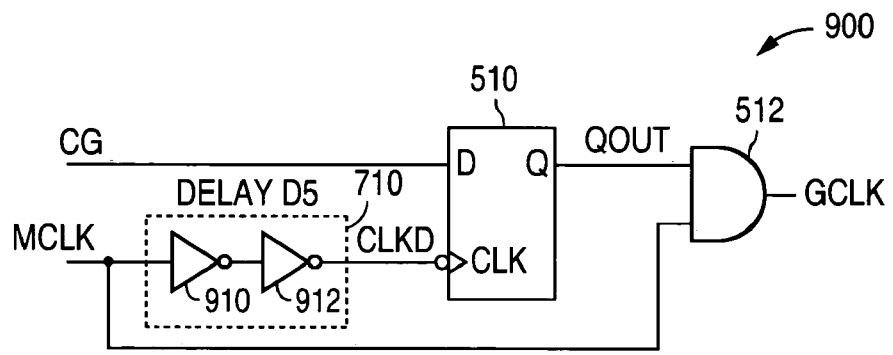
FIG. 9
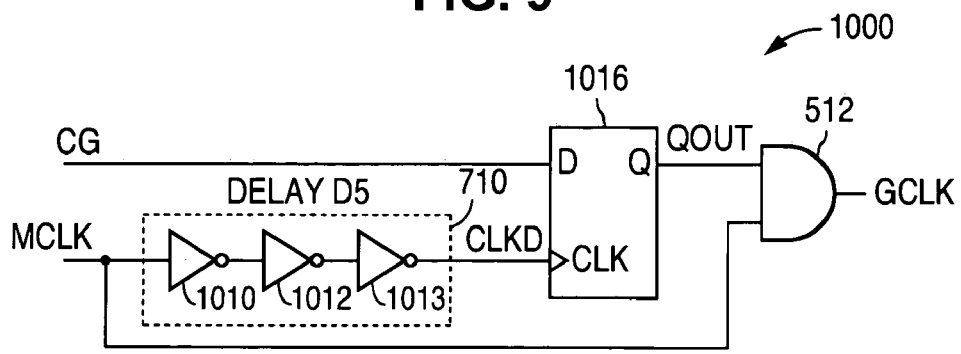
FIG. 10

GATED CLOCK CIRCUIT WITH A SUBSTANTIALLY INCREASED CONTROL SIGNAL DELAY

BACKGROUND OF THE INVENTION

1. Field of the Invention

The present invention relates to gated clock circuits and, more particularly, to a gated clock circuit with a substantially increased control signal delay.

2. Description of the Related Art

A gated clock circuit is used to generate a gated clock signal that has aperiodic pulses which can be switched on and off, depending upon the logic state of a control signal that is synchronous with (has a fixed time delay with respect to) the rising edges of a periodic master clock signal. Being aperiodic, the pulses of the gated clock signal occur less frequently than the pulses of the periodic master clock signal.

A critical factor in power sensitive applications, such as battery driven appliances, is the power dissipation of the CMOS logic blocks which, in turn, depends upon the frequency of the clock signal. Since the gated clock pulses occur less frequently than the master clock pulses, CMOS logic blocks that are driven by the gated clock pulses can dissipate significantly less power. As a result, gated clock pulses are ideal for power sensitive applications.

FIGS. 1A–1B show timing diagrams that illustrate a pair of prior-art clock signals. As shown in FIGS. 1A–1B, a master clock signal MCLK has a number of periodic pulses PP that occur at regular intervals, while a gated clock signal GCLK has a number of aperiodic pulses AP that occur at irregular intervals. Thus, in this example, three gated clock pulses are generated during the same period that seven master clock pulses are generated, thereby providing a significant savings in power.

As further shown in FIGS. 1A–1B, the aperiodic pulses AP of the gated clock signal GCLK have pulse widths that are equal to the pulse widths of, and are in phase with, the periodic pulses PP of the master clock signal MCLK. As a result, the aperiodic pulses AP of the gated clock signal GCLK must not contain any glitches, i.e., clock pulses that are shorter in duration than the pulse widths of the master clock signal MCLK.

FIGS. 2A–2B show timing diagrams that illustrate a pair of prior-art clock signals. As shown in FIGS. 2A–2B, a master clock signal MCLK has a number of periodic pulses PP that occur at regular intervals, while a gated clock signal GCLK has a number of aperiodic pulses AP that occur at irregular intervals.

In addition, however, the gated clock signal GCLK also has a first short pulse P1, referred to as a glitch, where only the rising edge of the pulse is in phase with a master clock pulse. This glitch is highly undesirable because it represents an extra clock edge that can cause a system malfunction.

Further, the gated clock signal GCLK also has a second short pulse P2 where only the falling edge of the pulse is in phase with a master clock pulse. In most logic designs, gated clock signals with shortened pulses, such as shortened pulse P2, are highly undesirable because the shortened pulses can cause system timing errors and system logic errors.

FIG. 3 shows a block diagram that illustrates a prior-art, gated clock circuit 300. As shown in FIG. 3, gated clock circuit 300 is implemented with a logic AND gate that has a first input A connected to the master clock signal MCLK, a second input B connected to a control signal CG, and an output that outputs a gated clock signal GCLK.

FIGS. 4A–4C show timing diagrams that illustrate the operation of the master clock signal MCLK, the control signal CG, and the gated clock signal GCLK of gated clock circuit 300. As shown in FIGS. 4A–4C, when the control signal CG is asserted, the rising edge of the control signal CG follows a rising edge of the master clock signal MCLK by a delay D1. Thus, the first pulse of the gated clock signal GCLK has a pulse width PW1 that is shorter than the pulse width PW of a master clock pulse by the delay D1.

In addition, a second "glitch" pulse of the gated clock signal GCLK is formed that has a pulse width PW2 that is shorter than the pulse width PW of a master clock pulse. As shown, the falling edge of the control signal CG follows a rising edge of the master clock signal MCLK by a delay D2, which is equal to delay D1, thereby forming the glitch pulse.

As noted above, both types of timing delays can lead to significant timing and logic issues. One approach to providing a gated clock signal that has a pulse width that is equal to the pulse width of, and in phase with, a master clock pulse is to use a flip-flop and a logic gate to form a glitchless gated clock circuit.

FIG. 5 shows a block diagram that illustrates a prior art, glitchless gated clock circuit 500. As shown in FIG. 5, clock circuit 500 includes a falling-edge triggered flip-flop 510 that has a data input connected to receive a control signal CG, an inverted clock input connected to receive a master clock signal MCLK, and a Q output that generates a signal QOUT. With an inverted clock input, the logic state of the signal QOUT is the same as the logic state of the control signal CG after the falling edge of a master clock pulse.

As further shown in FIG. 5, clock circuit 500 includes a logic AND gate 512 that has a first input A connected to the signal QOUT, a second input B connected to the master clock signal MCLK, and an output that outputs a gated clock signal GCLK. Thus, flop 510 and AND gate 512 respond to different edges of the master clock signal MCLK.

FIGS. 6A–6D show timing diagrams that illustrate the operation of the master clock signal MCLK, the control signal CG, the signal QOUT, and the gated clock signal GCLK of gated clock circuit 500. As shown in FIGS. 6A–6D, when the control signal CG is asserted, the rising edge of the control signal CG follows a rising edge of a first master clock pulse by a delay D1. Similarly, the falling edge of the control signal CG follows the rising edge of a second master clock pulse by a delay D2, which may or may not be equal to delay D1.

On the falling edge of the first master clock pulse, flop 510 receives the logic high of the control signal CG and, after a clock-to-Q delay D3, drives the signal QOUT high. The signal QOUT then falls after delay D4, which may or may not be equal to delay D3, after the falling edge of the second master clock pulse.

As further shown in FIGS. 6A–6D, the rising and falling edges of the second master clock pulse then clock the logic state of the signal QOUT through AND gate 512 to form the gated clock signal GCLK with a phase and pulse width PW that match the phase and pulse width PW of the master clock signal MCLK.

Although gated clock circuit 500 generates full-width, glitch-free clock pulses, circuit 500 imposes a highly undesirable timing constraint on the control signal CG. As previously described, the rising edge of the control signal CG has a delay D1 with respect to a rising edge of the master clock signal MCLK.

However, as shown in FIGS. 6A–6D, flop 510 samples the control signal CG on the falling edge of the master clock signal MCLK. Therefore, the control signal CG only has one-half of the clock period (minus the set up time of flop 510) to become valid.

Stating this in equation form:

$$D1_{MAX} + T_{SETUP} = PW, \qquad \text{EQ. 1}$$

where $D1_{MAX}$ is the maximum allowable delay for the rising edge of the control gate CG with respect to a rising edge of the master clock signal MCLK, $T_{SETUP}$ is the setup time of flop 510, and PW is the pulse width of the master clock signal MCLK.

Solving for $D1_{MAX}$ yields, $$D1_{MAX} = PW - T_{SETUP}, \qquad \text{EQ. 2}$$

For most systems, the pulse width of the clock signal is equal to ½ of the clock period. In equation form, PW=TCLK/2, where TCLK represents a clock period.

Thus, EQ. 2 can be rewritten as:

$$D1_{MAX} = TCLK/2 - T_{SETUP}. \qquad \text{EQ. 3}$$

The logic signals in a fully synchronous logic design usually have a full clock period (minus the flip-flop set up time) to become valid. However, as shown by EQ. 3, $D1_{MAX}$ is less than ½ of the clock period. As a result, the control signal CG must become valid in less than ½ of the clock period. In other words, the control signal CG must be twice as fast as the other logic signals. However, in many applications, especially in high speed logic applications, this condition is almost impossible to meet.

BRIEF DESCRIPTION OF THE DRAWINGS

FIGS. 8A–8E are timing diagrams illustrating the operation of the master clock signal MCLK, a delay clock signal CLKD, the control signal CG, the signal QOUT, and the gated clock signal GCLK of gated clock circuit 700 in accordance with the present invention.

FIG. 9 is a block diagram illustrating an example of a gated clock circuit 900 in accordance with the present invention.

FIG. 10 is a block diagram illustrating an example of a gated clock circuit 1000 in accordance with the present invention.

DETAILED DESCRIPTION OF THE INVENTION

Figure 1A:
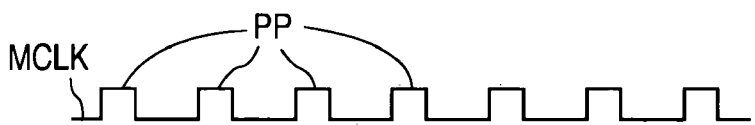
FIGS. 1A–1B are timing diagrams illustrating a pair of prior-art clock signals.
Figure 1B:
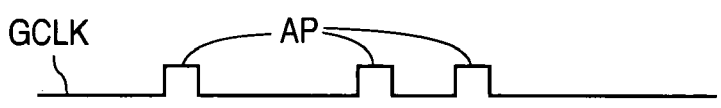
Figure 2A:
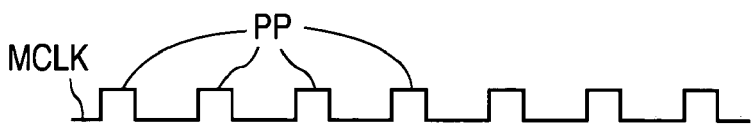
FIGS. 2A–2B are timing diagrams illustrating a pair of prior-art clock signals.
Figure 2B:
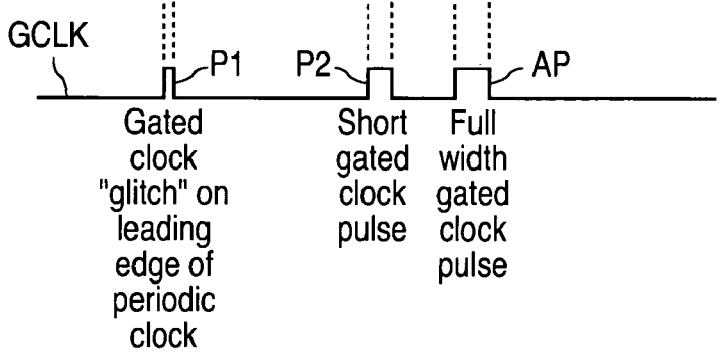
Figure 3:
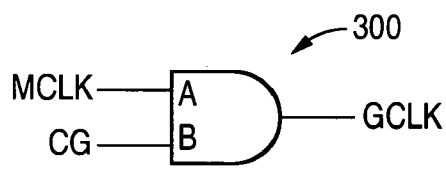
FIG. 3 is a block diagram illustrating a prior-art, gated clock circuit 300.
Figure 5:
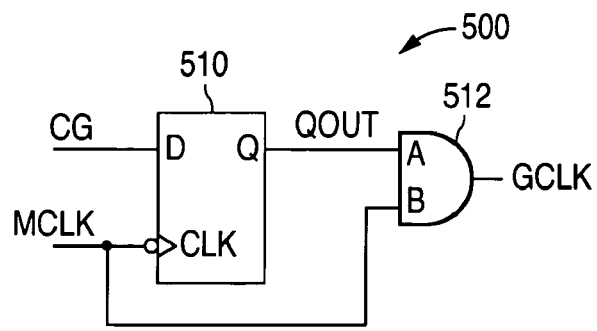
FIG. 5 is a block diagram illustrating a prior art, glitchless gated clock circuit 500.
Figure 4A:
FIGS. 4A–4C are timing diagrams illustrating the operation of the master clock signal MCLK, the control signal CG, and the gated clock signal GCLK of gated clock circuit 300.
Figure 4B:
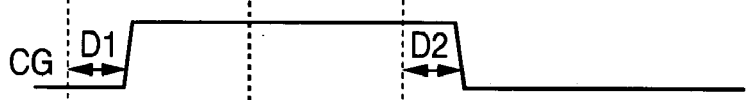
Figure 4C:
Figure 6A:
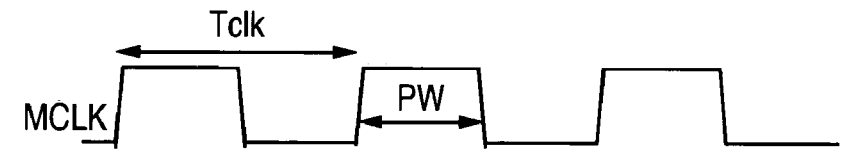
FIGS. 6A–6D are timing diagrams illustrating the operation of the master clock signal MCLK, the control signal CG, the signal QOUT, and the gated clock signal GCLK of gated clock circuit 500.
Figure 6B:
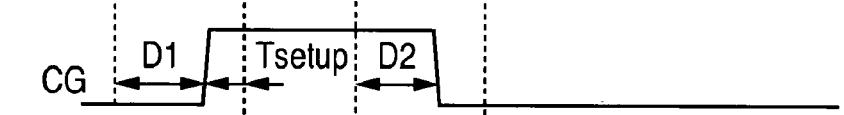
Figure 6C:
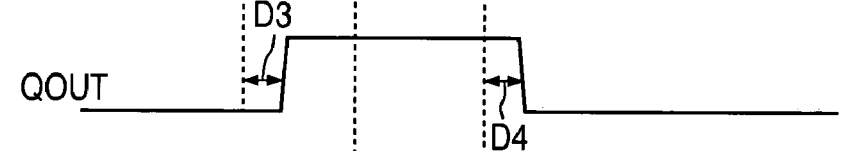
Figure 6D:
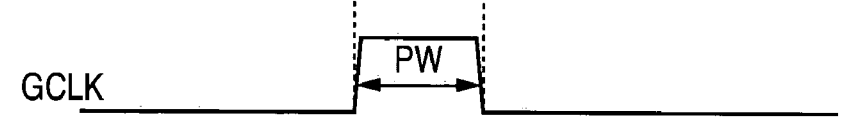
Figure 7:
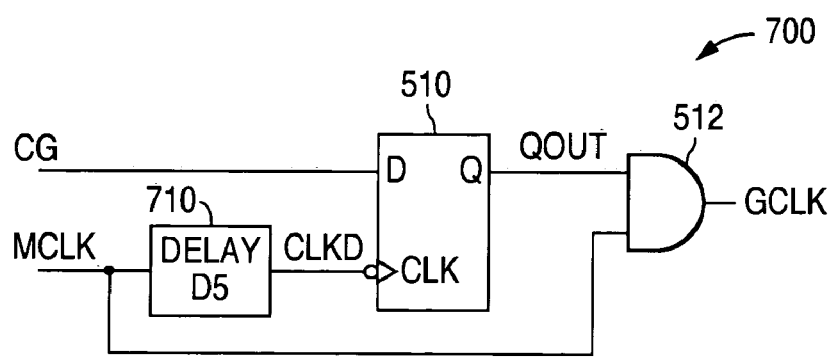
FIG. 7 is a block diagram illustrating an example of a gated clock circuit 700 in accordance with the present invention.

FIG. 7 shows a block diagram that illustrates an example of a gated clock circuit 700 in accordance with the present invention. As described in greater detail below, gated clock circuit 700 significantly extends the allowable delay of the rising and falling edges of a control signal with respect to the rising edge of a master clock signal. The allowable delay can be nearly equal to the length of a master clock period.

Gated clock circuit 700 is similar to gated clock circuit 500 and, as a result, utilizes the same reference numerals to designate the structures which are common to both circuits. As shown in FIG. 7, gated clock circuit 700 differs from gated clock circuit 500 in that circuit 700 additionally includes a delay block 710 that delays the master clock signal MCLK by a delay D5 to output a delayed clock signal CLKD.

In addition, flop 510 receives the delayed clock signal CLKD instead of the master clock signal MCLK, while AND gate 512 continues to receive the master clock signal MCLK. Thus, AND gate 512 receives the periodic master clock signal MCLK before flop 510 receives the delayed clock signal CLKD.

FIGS. 8A–8E show timing diagrams that illustrate the operation of the master clock signal MCLK, the delayed clock signal CLKD, the control signal CG, the signal QOUT, and the gated clock signal GCLK of gated clock circuit 700. As shown in FIGS. 8A–8E, the delayed clock signal CLKD is identical to the master clock signal MCLK, except that the rising edge of the delayed clock signal CLKD is delayed with respect to the rising edge of the master clock signal MCLK by delay D5. Similarly, the falling edge of the delayed clock signal CLKD is delayed with respect to the falling edge of the master clock signal MCLK by delay D5.

When the control signal CG is asserted, the rising or falling edge of the control signal CG follows the rising edge of a first master clock pulse by a delay D1. The delay D1 can be any value as long as the edge of the control signal CG rises or falls a setup time $T_{SETUP}$ before the falling edge of the delayed clock signal CLKD.

The falling edge of the delayed clock signal CLKD, in turn, must fall a clock-to-Q delay Tcq before the rising edge of a second master clock pulse. When this occurs, flop 510 receives a logic high or low from the control signal CG and, after the clock-to-Q delay Tcq, outputs the signal QOUT as a logic high or logic low.

Following this, the rising and falling edges of the second master clock pulse clocks the logic state of the signal QOUT through AND gate 512 to form the gated clock signal GCLK. As shown in FIGS. 8A–8E, the gated clock signal GCLK has a phase and pulse width PW that match the phase and pulse width PW of the master clock signal MCLK.

In accordance with the present invention, as further shown in FIGS. 8A–8E, the delay D1 of gated clock circuit 700 can be substantially longer than the delay D1 of gated clock circuit 500. Specifically, because the falling edge of the delayed clock signal CLKD has been delayed by delay D5, the control signal CG can have a substantially increased delay D1 with respect to the rising edge of the master clock signal MCLK.

Referring to FIGS. 8A–8E, a clock period TCLK is equal to:

$$TCLK = D1_{MAX} + T_{SETUP} + Tcq \qquad \text{EQ. 4}$$

where Tcq is the clock-to-Q delay of flop 510.

Solving for $D1_{MAX}$ yields:

$$D1_{MAX}=TCLK-T_{SETUP}-Tcq \quad\quad \text{EQ. 5}$$

In most applications, the flip-flop set up time ($T_{SETUP}$) and the flip-flop clock-to-Q delay (Tcq) are only a small fraction of the clock period (TCLK). Therefore, neglecting these parameters, EQ. 5 can be approximated by EQ. 6 as:

$$D1_{MAX} \sim TCLK, \quad\quad \text{EQ. 6}$$

while EQ. 3 can be approximated by EQ. 7 as:

$$D1_{MAX} \sim TCLK/2. \quad\quad \text{EQ. 7}$$

Comparing EQs. 6 and 7 shows that gated clock circuit 700 allows approximately twice as much delay D1 for the control signal CG to become valid with respect to the rising edge of the master clock signal MCLK. This additional delay time, in turn, is extremely advantageous, especially in high speed logic applications.

The maximum value of delay D5 ($D5_{MAX}$) can be determined by first defining a clock period TCLK with terms that include the maximum value of delay D5 as shown in equation EQ. 8:

$$TCLK=D5_{MAX}+TCLK/2+Tcq \quad\quad \text{EQ. 8}$$

Solving for $D5_{MAX}$ yields equation EQ. 9:

$$D5_{MAX}=TCLK/2-Tcq. \quad\quad \text{EQ. 9}$$

Thus, the present invention provides a gated clock signal GCLK that has a phase and pulse width PW that match the phase and pulse width PW of the master clock signal MCLK, while at the same time allowing a substantially increased time delay D1 with respect to the rising edge of the master clock signal MCLK.

FIG. 9 shows a block diagram that illustrates an example of a gated clock circuit 900 in accordance with the present invention. Gated clock circuit 900 is similar to gated clock circuit 700 and, as a result, utilizes the same reference numerals to designate the structures which are common to both circuits.

As shown in FIG. 9, gated clock circuit 900 differs from gated clock circuit 700 in that delay block 710 of circuit 900 includes a pair of serially-connected inverters 910 and 912. The pair of serially-connected inverters 910 and 912, in turn, provide the delay D5. Although a pair of serially-connected inverters are shown, additional delay can be provided by using any even number of inverters placed in series.

FIG. 10 shows a block diagram that illustrates an example of a gated clock circuit 1000 in accordance with the present invention. Gated clock circuit 1000 is similar to gated clock circuit 700 and, as a result, utilizes the same reference numerals to designate the structures which are common to both circuits.

As shown in FIG. 10, gated clock circuit 1000 differs from gated clock circuit 700 in that delay block 710 of circuit 1000 includes three serially-connected inverters 1010, 1012, and 1014. The serially-connected inverters 1010, 1012, and 1014, in turn, provide the delay D5. Although three serially-connected inverters are shown, additional delay can be provided by using any odd number of inverters placed in series. In addition, gated clock circuit 1000 includes a rising-edge triggered flip-flop 1016 in lieu of the falling-edge triggered flip-flop 510.

One of the advantages of using inverters to provide delay D5 is that delay D5 increases under slow process, voltage, and temperature (PVT) conditions, and decreases under fast PVT conditions. Under slow PVT conditions, the control signal CG arrives later in time than under normal PVT conditions. Thus, delay D5 under slow PVT conditions should be longer to accommodate the later arrival time of the control signal CG.

Similarly, delay D5 decreases under fast PVT conditions. Under fast PVT conditions, the control signal CG arrives earlier in time than under normal PVT conditions. Thus, delay D5 under fast PVT conditions should be shorter to accommodate the earlier arrival time of the control signal CS.

It should be understood that the above descriptions are examples of the present invention, and that various alternatives of the invention described herein may be employed in practicing the invention. For example, although the present example illustrates the invention with an edge-triggered flip-flop and a logic AND gate, other combinations of logic elements can alternately be used. Thus, it is intended that the following claims define the scope of the invention and that structures and methods within the scope of these claims and their equivalents be covered thereby.

What is claimed is:

1. A gated clock circuit comprising:
   a first logic circuit having a first input, a second input, and an intermediate output, the first logic circuit to receive a master clock signal on the first input, the master clock signal having a plurality of edges that include a first edge, a second edge, and a third edge, the first logic circuit to generate an intermediate signal on the intermediate output a time delay after the second edge of the master clock signal is detected on the first input, the intermediate signal to have a logic state defined by a logic state of a control signal on the second input; and
   a second logic circuit having a third input, a fourth input, and a signal output, the second logic circuit generating a gated clock signal on the signal output that has a logic state defined by the logic state of the intermediate signal on the third input when the third edge of the master clock signal is detected on the fourth input,
   when the control signal changes states on the second input, the control signal changes states during a time period that begins with a detection of the first edge on the first input and lasts for more than one-half of a master clock period.

2. The gated clock circuit of claim 1 wherein the gated clock signal has a pulse width equal to one-half a master clock period.

3. The gated clock circuit of claim 1 wherein when the control signal changes states on the second input, the control signal changes at least a logic time before the third edge of the master clock signal is detected on the fourth input, the logic time being equal to a time required for the first logic circuit to recognize that the control signal has changed logic states, and a time required for the first logic circuit to change the logic state of the intermediate signal.

4. The gated clock circuit of claim 1 wherein when the control signal changes states on the second input, the control signal changes a logic time before the third edge of the master clock signal is detected on the fourth input, the logic time being substantially equal to a time required for the first logic circuit to recognize that the control signal has changed logic states, and a time required for the first logic circuit to change the logic state of the intermediate signal.

5. The gated clock circuit of claim 1 wherein the second edge follows the first edge and no edge lies between the first edge and the second edge, and the third edge follows the second edge and no edge lies between the second edge and the third edge.

6. The gated clock circuit of claim 1 wherein the master clock period is equal to the time period plus a logic period, the logic period equaling a time required for the first logic circuit to recognize that the control signal has changed logic states, and a time required for the first logic circuit to change the logic state of the intermediate signal.

7. The gated clock circuit of claim 5 wherein the master clock period is substantially equal to the time period plus a logic period, the logic period equaling a time required for the first logic circuit to recognize that the control signal has changed logic states, and a time required for the first logic circuit to change the logic state of the intermediate signal.

8. The gated clock circuit of claim 5 wherein the first logic circuit includes:
   a delay circuit that receives the master clock signal and generates a delayed clock signal; and
   a logic device that generates the intermediate signal in response to an edge of the delayed clock signal and the logic state of the control signal that is present on the second input when the edge of the delayed clock signal is detected.

9. The gated clock circuit of claim 8 wherein:
   the logic device responds to a falling edge of the delayed clock signal; and
   the delay circuit includes a plurality of even-numbered inverters.

10. The gated clock circuit of claim 8 wherein:
    the logic device responds to a rising edge of the delayed clock signal; and
    the delay circuit includes a plurality of odd-numbered inverters.

11. A method of generating a gated clock signal, the method comprising:
    receiving a master clock signal on a first input, the master clock signal having a plurality of edges that include a first edge, a second edge, and a third edge;
    generating an intermediate signal a time delay after the second edge of the master clock signal is detected on the first input, the intermediate signal to have a logic state defined by a logic state of a control signal on a second input; and
    generating a gated clock signal that has a logic state defined by the logic state of the intermediate signal when the third edge of the master clock signal is detected on a third input,
    when the control signal changes states on the second input, the control signal changes states during a time period that begins with a detection of the first edge on the first input and lasts for more than one-half of a master clock period.

12. The method of claim 11 wherein the gated clock signal has a pulse width equal to one-half a master clock period.

13. The method of claim 11 wherein when the control signal changes states on the input, the control signal changes a logic time before the second edge of the master clock signal is detected, the logic time being equal to a time required for a logic circuit to recognize that the control signal has changed logic states, and a time required for the logic circuit to change the logic state of the intermediate signal.

14. The method of claim 11 wherein when the control signal changes states on the input, the control signal changes a logic time before the second edge of the master clock signal is detected, the logic time being substantially equal to a time required for a logic circuit to recognize that the control signal has changed logic states, and a time required for the logic circuit to change the logic state of the intermediate signal.

15. The method of claim 11 wherein the second edge follows the first edge and no edge lies between the first edge and the second edge, and the third edge follows the second edge and no edge lies between the second edge and the third edge.

16. The method of claim 15 wherein the master clock period is equal to the time period plus a logic period, the logic period equaling a time required for a logic circuit to recognize that the control signal has changed logic states, and a time required for the logic circuit to change the logic state of the intermediate signal.

17. The method of claim 15 wherein the master clock period is substantially equal to the time period plus a logic period, the logic period equaling a time required for a logic circuit to recognize that the control signal has changed logic states, and a time required for the logic circuit to change the logic state of the intermediate signal.

18. The method of claim 15 wherein generating the intermediate signal includes:
    delaying the master clock signal to generate a delayed clock signal; and
    generating the intermediate signal in response to an edge of the delayed clock signal and the logic state of the control signal that is present on the second input when the edge of the delayed clock signal is detected.

19. The method of claim 18 and further comprising passing the master clock signal through an inverting delay circuit to form the delayed clock signal.

20. The method of claim 18 and further comprising passing the master clock signal through a non-inverting delay circuit to form the delayed clock signal.

* * * * *

UNITED STATES PATENT AND TRADEMARK OFFICE
CERTIFICATE OF CORRECTION

| | | |
|---|---|---|
| PATENT NO. | : 7,042,267 B1 | Page 1 of 1 |
| APPLICATION NO. | : 10/848673 | |
| DATED | : May 9, 2006 | |
| INVENTOR(S) | : Pasqualini | |

It is certified that error appears in the above-identified patent and that said Letters Patent is hereby corrected as shown below:

Column 7, Line 1,
Delete "1" and replace with --5--.

Signed and Sealed this

Eleventh Day of July, 2006

JON W. DUDAS
*Director of the United States Patent and Trademark Office*